United States Patent
Jang et al.

(10) Patent No.: US 10,878,792 B2
(45) Date of Patent: Dec. 29, 2020

(54) VEHICLE AND METHOD OF CONTROLLING THE SAME

(71) Applicants: Hyundai Motor Company, Seoul (KR); Kia Motors Corporation, Seoul (KR)

(72) Inventors: Jaehyuk Jang, Seoul (KR); Minsik Yang, Seoul (KR); Yonghwan Hwang, Gyeonggi-do (KR); Young Kim, Gyeonggi-do (KR); HyeonHee Kang, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/560,639

(22) Filed: Sep. 4, 2019

(65) Prior Publication Data

US 2020/0258491 A1 Aug. 13, 2020

(30) Foreign Application Priority Data

Feb. 8, 2019 (KR) .................. 10-2019-0014888

(51) Int. Cl.
| | | |
|---|---|---|
| *G10K 11/16* | (2006.01) | |
| *B60C 23/00* | (2006.01) | |
| *H02K 41/035* | (2006.01) | |
| *B60C 23/04* | (2006.01) | |
| *H04R 7/00* | (2006.01) | |

(52) U.S. Cl.
CPC ............ *G10K 11/16* (2013.01); *B60C 23/002* (2013.01); *B60C 23/0486* (2013.01); *H02K 41/0354* (2013.01); *H04R 7/00* (2013.01); *H04R 2499/13* (2013.01)

(58) Field of Classification Search
CPC ... G10K 11/16; B60C 23/002; B60C 23/0486; H02K 41/0354; H04R 7/00; H04R 1/025; H04R 2499/13; H04R 5/02; H04R 5/023; B60R 11/0217; H04B 1/082; H03G 3/32
USPC .................................................. 381/89, 389
See application file for complete search history.

(56) References Cited

U.S. PATENT DOCUMENTS

| | | | | |
|---|---|---|---|---|
| 6,445,287 | B1 * | 9/2002 | Schofield ............ | B60C 23/0401 340/442 |
| 6,945,103 | B1 * | 9/2005 | Lee ..................... | B60C 23/0408 73/146.5 |
| 2004/0065398 | A1 * | 4/2004 | Sapir ..................... | B60C 17/00 152/519 |
| 2006/0092007 | A1 * | 5/2006 | Cantu .................. | B60C 23/0401 340/442 |
| 2007/0241872 | A1 * | 10/2007 | Chien .................. | B60C 23/0408 340/447 |
| 2008/0178667 | A1 * | 7/2008 | Kusunoki ........... | B60C 23/0408 73/146.4 |

(Continued)

*Primary Examiner* — Ahmad F. Matar
*Assistant Examiner* — Sabrina Diaz
(74) *Attorney, Agent, or Firm* — Mintz Levin Cohn Ferris Glovsky and Popeo, P.C.; Peter F. Corless

(57) ABSTRACT

A vehicle is provided and includes a first tire, a second tire, and a detector that is configured to detect an air pressure of the first tire. A vibration generator is configured to generate vibration in the second tire. A controller is configured to operate the vibration generator to cause the second tire vibrate when the air pressure of the first tire satisfies a predetermined normal condition.

18 Claims, 5 Drawing Sheets

(56) References Cited

U.S. PATENT DOCUMENTS

| | | | |
|---|---|---|---|
| 2014/0131134 A1* | 5/2014 | Kobayashi | B60R 11/0217 |
| | | | 181/199 |
| 2017/0097223 A1* | 4/2017 | Darrer | G01B 17/00 |
| 2017/0232889 A1* | 8/2017 | Miura | B62D 15/029 |
| | | | 340/441 |
| 2020/0114707 A1* | 4/2020 | Li | B60C 23/0455 |

* cited by examiner

VEHICLE AND METHOD OF CONTROLLING THE SAME

CROSS-REFERENCE TO RELATED APPLICATION(S)

This application is based on and claims priority under 35 U.S.C. § 119 to Korean Patent Application No. 10-2019-0014888, filed on Feb. 8, 2019, the disclosure of which is incorporated by reference in its entirety.

TECHNICAL FIELD

The present disclosure relates to a vehicle capable of generating a sound pressure using a spare tire, and a method of controlling the vehicle.

BACKGROUND

A speaker device is typically mounted in a box-shaped enclosure with a speaker unit that outputs a sound. The sound of the speaker unit may be distorted due to interference between the sound generated from the front surface of a diaphragm and the sound generated from the rear surface of the diaphragm since the enclosure prevents the interference between a front sound and a rear sound of the speaker unit to enable good sound output. In addition, a resonance space inside the enclosure enhances sound quality by reinforcing a bass.

However, there are various limitations in mounting the speaker device in a vehicle. A bulky enclosure is required to output the good sound, but it is difficult to mount the bulky enclosure in a limited space, such as a vehicle interior space. The bulky enclosure may also increase a weight of the vehicle and raise the costs.

SUMMARY

Therefore, the disclosure provides a vehicle capable of generating a sound pressure using a spare tire, and a method of controlling the vehicle. Additional aspects of the disclosure will be set forth in part in the description which follows and, in part, will be obvious from the description, or may be learned by practice of the disclosure.

In accordance with an aspect of the disclosure, a vehicle may include: a first tire; a second tire; a detector configured to detect an air pressure of the first tire; a vibration generator configured to generate vibration in the second tire; and a controller configured to operate the vibration generator to cause the second tire vibrate when the air pressure of the first tire satisfies a predetermined normal condition. The vibration generator may include a magnet configured to generate a magnetic flux; a voice coil configured to vibrate by interaction with the magnetic flux; and a power supply configured to apply a current to the voice coil. The controller may be configured to operate the power supply to apply the current to the voice coil when the air pressure of the first tire satisfies the normal condition. The second tire may vibrate by the vibration of the voice coil, and generate a sound pressure.

The vehicle may further include: an air pressure regulator configured to adjust the air pressure of the second tire. The controller may be configured to operate the air pressure regulator to increase or decrease the air pressure of the second tire based on whether the air pressure of the first tire satisfies the normal condition. In addition, the controller may be configured to operate the air pressure regulator to adjust the air pressure of the second tire to reach a maximum possible value when the air pressure of the first tire does not satisfy the normal condition. The controller may also be configured to operate the air pressure regulator to decrease the air pressure of the second tire when the air pressure of the first tire satisfies the normal condition.

The vehicle may further include: an inputter configured to receive an output mode from a user. The controller may be configured to determine a target air pressure of the second tire based on the received output mode, and operate the air pressure regulator such that the air pressure of the second tire becomes the target air pressure. The controller may be configured to determine the target air pressure as a lowest possible value when the received output mode is a first output mode. The air pressure regulator may include a piston; and an actuator configured to drive the piston. The second tire may be disposed in at least one of inside or outside of a vehicle body.

In accordance with another aspect of the disclosure, a method of operating a vehicle may include: detecting an air pressure of a first tire; and operating a vibration generator to cause a second tire to vibrate when the air pressure of the first tire satisfies a predetermined normal condition. The operating of the vibration generator may include applying a current to a voice coil when the air pressure of the first tire satisfies the normal condition. The applying of the current to the voice coil may include vibrating the second tire by vibration of the voice coil; and generating a sound pressure by the second tire.

The method may further include: adjusting an air pressure of the second tire based on whether the air pressure of the first tire satisfies the normal condition. The adjusting of the air pressure of the second tire may include adjusting the air pressure of the second tire to reach a maximum possible value when the air pressure of the first tire does not satisfy the normal condition. In addition, the adjusting of the air pressure of the second tire may include decreasing the air pressure of the second tire when the air pressure of the first tire satisfies the normal condition.

The method may further include: receiving an output mode from a user. The adjusting of the air pressure of the second tire may include determining a target air pressure of the second tire based on the received output mode; and adjusting the air pressure of the second tire to reach the target air pressure. The determining of the target air pressure of the second tire based on the received output mode may include determining the target air pressure as a lowest possible value when the received output mode is a first output mode. The second tire may be disposed in at least one of inside or outside of a vehicle body.

In accordance with another aspect of the disclosure, a recording medium having stored therein a computer program to execute a method, the method may include: in combination with a computing device, detecting an air pressure of a first tire; and vibrating a second tire when the air pressure of the first tire satisfies a predetermined normal condition.

BRIEF DESCRIPTION OF THE DRAWINGS

These and/or other aspects of the disclosure will become apparent and more readily appreciated from the following description of the exemplary embodiments, taken in conjunction with the accompanying drawings of which.

DETAILED DESCRIPTION

Figure 1:
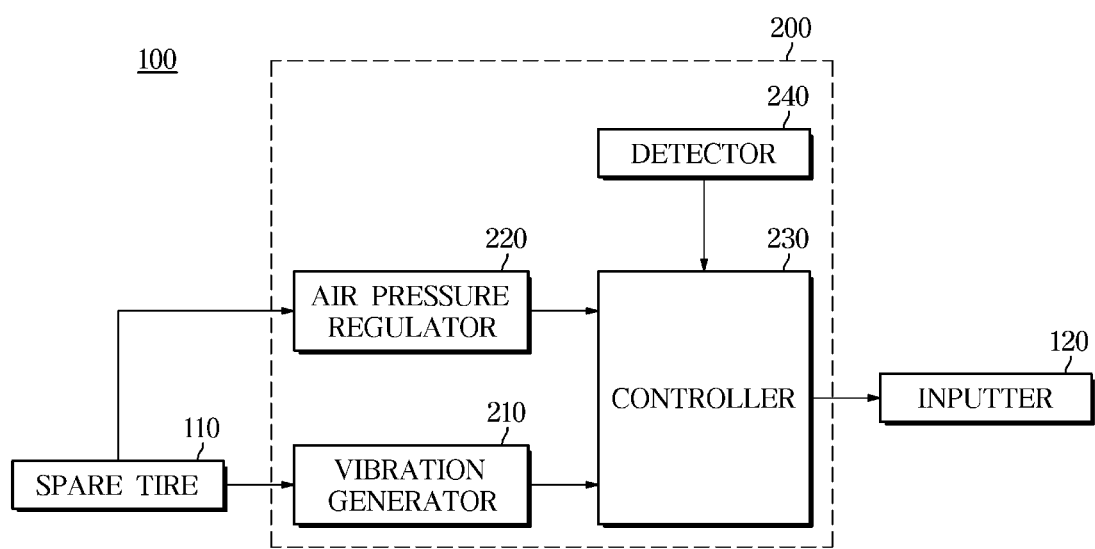
FIG. 1 is a control block diagram of a vehicle according to exemplary embodiments of the disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Like reference numerals refer to like elements throughout the specification. Not all elements of embodiments of the disclosure will be described, and description of what are commonly known in the art or what overlap each other in the exemplary embodiments will be omitted. The terms as used throughout the specification, such as "~part," "~module," "~member," "~block," etc., may be implemented in software and/or hardware, and a plurality of "~parts," "~modules," "~members," or "~blocks" may be implemented in a single element, or a single "~part," "~module," "~member," or "~block" may include a plurality of elements.

It will be understood that when an element is referred to as being "connected" to another element, it can be directly or indirectly connected to the other element, wherein the indirect connection includes "connection" via a wireless communication network. Also, when a part "includes" or "comprises" an element, unless there is a particular description contrary thereto, the part may further include other elements, not excluding the other elements. It will be understood that, although the terms first, second, third, etc., may be used herein to describe various elements, it should not be limited by these terms. These terms are only used to distinguish one element from another element.

As used herein, the singular forms "a," "an" and "the" are intended to include the plural forms as well, unless the context clearly indicates otherwise. An identification code is used for the convenience of the description but is not intended to illustrate the order of each step. Each of the steps may be implemented in an order different from the illustrated order unless the context clearly indicates otherwise.

Figure 2:
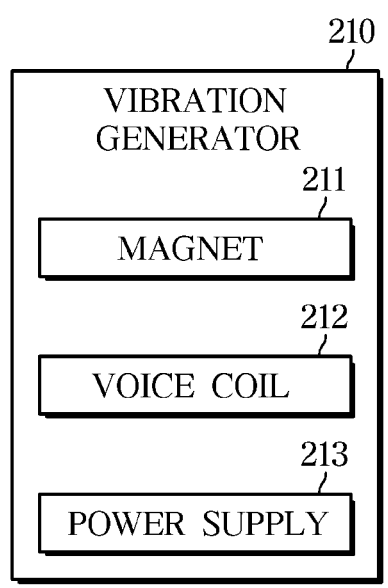
FIG. 2 is a view illustrating a detailed configuration of a vibration generator according to exemplary embodiments of the disclosure.
Figure 3:
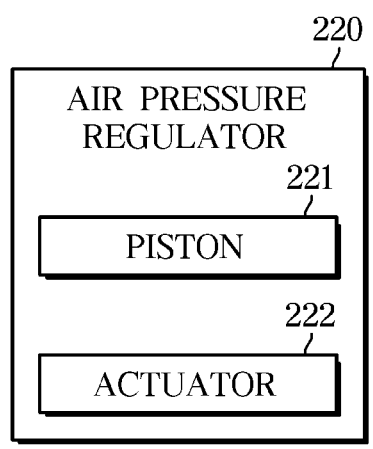
FIG. 3 is a view illustrating a detailed configuration of an air pressure regulator according to exemplary embodiments of the disclosure.

The principle and embodiments of the disclosure will now be described with reference to the accompanying drawings. FIG. 1 is a control block diagram of a vehicle according to exemplary embodiments of the disclosure, FIG. 2 is a view illustrating a detailed configuration of a vibration generator according to exemplary embodiments of the disclosure, and FIG. 3 is a view illustrating a detailed configuration of an air pressure regulator according to exemplary embodiments of the disclosure.

Referring to FIG. 1, a vehicle 100 may include a spare tire 110, an inputter 120, and a speaker unit 200. The spare tire 110 is a tire capable of replacing the tire mounted on a wheel of the vehicle 100 and may be mounted on the vehicle 100 in case of an emergency. The spare tire 110 may be disposed on the outside of a vehicle body or may be stored within the vehicle. Additionally, a plurality of spare tire 110 may be provided. Particularly, the spare tire 110 may be disposed in a trunk space inside the vehicle body or disposed outside the vehicle body, and may be disposed on the rear or side of the vehicle 100 depending on the type of the vehicle 100. However, the disclosure is not limited thereto, and the spare tire 110 may be disposed on an upper part or a lower part of the vehicle 100.

The inputter 120 may be configured to receive an output mode from a user. In particular, the output mode may refer to a mode for adjusting frequency of a sound source to be output, and may be a mode for emphasizing the sound source having a frequency range of a specific band. For example, the inputter 120 may be configured to receive a bass setting mode for emphasizing a low range of the user and may be configured to receive at least one step-by-step bass setting mode for adjusting the amount of bass output. Accordingly, the inputter 120 may include a hardware device, such as various types of buttons or switches, pedals, keyboards, mouse, track-balls, various levers, handles, or sticks for a user input.

Additionally, the inputter 120 may be provided in a navigation device (not shown), and the navigation device may include a display (not shown). The inputter 120 may be installed in a dial manipulator (not shown) for controlling the performance of the vehicle 100. The inputter 120 may further include a graphical user interface (GUI), such as a touch pad, for the user input, that is, a software device. The touch pad may be implemented as a touch screen panel (TSP) to form a mutual layer structure together with the display. In the case of the TSP having the mutual layer structure with the touch pad, the display may also be used as the inputter 120.

The speaker unit 200 may include a detector 240, an air pressure regulator 220, a vibration generator 210, and a controller 230. In particular, the detector 240 may be configured to detect information related to the tire mounted on the wheel. Additionally, the detector 240 may be configured to detect an air pressure of the tire mounted on the wheel. At this time, the tire mounted on the wheel may refer to the tire mounted on the wheel of the vehicle 100, and may refer to the tire used for driving. In addition, the detector 240 may be configured to detect information related to various tires, such as a temperature of the tire mounted on the wheel, and is not limited to the above-described air pressure. Accordingly, the detector 240 may be implemented with various sensors configured to detect the information related to the tire. The detector 240 may be implemented as a sensor device including a pressure sensor, particularly, an air pressure sensor device.

Further, the detector 240 may be implemented to include a tire pressure monitoring system (TPMS). The detector 240 may be configured to detect the air pressure of the tire mounted on the wheel, and transmit the detected result to the controller 230. The detected result may be used as a control basis of the controller 230. The vibration generator 210 may cause the spare tire 110 to generate a vibration. Particularly, the vibration generator 210 may be configured to generate the vibration and transmit the generated vibration to the spare tire 110.

Referring to FIG. 2, the vibration generator 210 may include a magnet 211 for generating a magnetic flux, a voice coil 212 displaced by mutual interaction with the magnetic flux generated in the magnet 21 while being magnetized when a current is applied, and a power supply 213 configured to apply the current to the voice coil 212. The voice coil 212 is magnetized when the current is applied, and thus, the voice coil 212 may interact with the magnetic flux generated in the magnet 21. As a result, the voice coil 212 may perform a displacement movement, i.e., the vibration. The vibration of the voice coil 212 may cause the spare tire 110 to vibrate, and the spare tire 110 may generate a sound pressure.

The vibration generator 210 may be connected to one surface of the spare tire 110. For example, one surface of the vibration generator 210 and one surface of the spare tire 110 may be in contact with each other, and the vibration generated in the vibration generator 210 may be transmitted to the spare tire 110 through the contact surface. Particularly, the vibration may be transmitted to one surface of the spare tire 110 in contact with the vibration generator 210, and the vibration may be generated in the spare tire 110. However, a connection method of the vibration generator 210 and the spare tire 110 is not limited to the above-described example, and may include various connection methods for transmitting the vibration.

The power supply 213 may be configured to apply the current to the voice coil 212. Particularly, the power supply 213 may be configured to apply at least one of a direct current or an alternating current to the voice coil 212. The power supply 213 may be configured to apply a voltage as well as the current to the voice coil 212. Additionally, the power supply 213 may cause the voice coil 212 to vibrate by applying the current to the voice coil 212 based on a control signal of the controller 230. The power supply 213 may include various circuits for applying the voltage to the voice coil 213, for example, the circuit including a converter or a switch. The air pressure regulator 220 may be configured to adjust the air pressure of the spare tire 110. The air pressure regulator 220 may be configured to increase the air pressure of the spare tire 110 by supplying the air pressure to the spare tire 110 and decrease the air pressure of the spare tire 110 by discharging the air pressure from the spare tire 110.

Referring to FIG. 3, the air pressure regulator 220 may include a piston 221 and an actuator 222. The piston 221 may be configured to adjust the air pressure of the spare tire 110 and may be slidably installed within the air pressure regulator 220. The actuator 222 may be configured to drive the piston 221 and cause the piston 221 to slide to thus adjust the air pressure of the spare tire 110. The actuator 222 may be configured to drive the piston 221 based on the control signal of the controller 230.

The actuator 222 may be implemented with one or more memories configured to store an algorithm to operate the components in the air pressure regulator 220 or data regarding a program that implements the algorithm, and one of more processors configured to execute the aforementioned operation using the data stored in the memory. The memory and the processor may be implemented in separate chips, or may be implemented in a single chip. Alternatively, the memory and the processor may be implemented in a chip separate from the processor in association with the controller 230, and may be implemented in the single chip with the processor.

In addition, the air pressure regulator 220 may further include components necessary to adjust the air pressure of a cylinder, a gear, and the like. The controller 230 may be configured to operate the vibration generator 210 to vibrate the spare tire 110 based on whether the air pressure of the tire mounted on the wheel satisfies a predetermined normal condition. The predetermined normal condition may be a condition for the case where the air pressure of the tire mounted on the wheel is in a state in which the tire may drive. For example, conditions for a normally drivable air pressure range may be included.

Particularly, the controller 230 may be configured to operate the power supply 213 to apply the current to the voice coil 212 when the air pressure of the tire mounted on the wheel satisfies the predetermined normal condition. The voice coil 212 may vibrate by the current supplied from the power supply 213 and the spare tire 110 may vibrate by the vibration of the voice coil 212. The sound pressure may be generated by the vibration of the spare tire 110. The controller 230 may also be configured to operate the air pressure regulator 220 to increase or decrease the air pressure of the spare tire 110 based on whether the air pressure of the tire mounted on the wheel satisfies the predetermined normal condition.

The controller 230 may be configured to transmit an air pressure supply signal or an air pressure discharge signal to the air pressure regulator 220. The controller 230 may be configured to supply or discharge the air pressure from the spare tire 221 by the operation of the piston 221 by the actuator 222 of the air pressure regulator 220. Therefore, the air pressure of the spare tire 110 may be increased or decreased. Particularly, the controller 230 may be configured to operate the air pressure regulator 220 to adjust the air pressure of the spare tire 110 to reach a maximum possible value when the air pressure of the tire mounted on the wheel does not satisfy the predetermined normal condition.

In other words, when the air pressure of the tire mounted on the wheel does not satisfy the predetermined normal condition, the controller 230 may be configured to determine that the spare tire 110 is to be used for driving and may be configured to operate the air pressure regulator 220 to adjust the air pressure of the spare tire 110 to each the maximum possible value to place the spare tire 110 in a driving state before being mounted on the wheel. Accordingly, when the air pressure of the tire mounted on the wheel used for driving is not in a normal state, the controller 230 may be configured to the spare tire 110 to be in the state suitable for driving, thereby enhancing the driving stability.

When the tire pressure of the tire mounted on the wheel satisfies the normal condition, the controller 230 may be configured to operate the air pressure regulator 220 to decrease the air pressure of the spare tire 110. At this time, when the air pressure of the tire mounted on the wheel satisfies the normal condition, since the spare tire 110 is not used for driving, the controller 230 may be configured to decrease the air pressure of the spare tire 110 to reduce the elastic modulus. When the elastic modulus of the spare tire 110 is reduced, a resonance frequency of the sound pressure generated by the vibration of the spare tire 110 may be decreased. Therefore, the sound source of a low range may be output more abundantly, and the spare tire 110 may replace function of a woofer.

The controller 230 may be configured to determine a target air pressure of the spare tire 110 based on the output mode received through the inputter 120 and operate the air pressure regulator 220 to adjust the air pressure of the spare tire 110 to reach the target air pressure. Particularly, the controller 230 may be configured to determine an air pressure value that corresponds to the received output mode as the target air pressure. The air pressure value that corresponds to the received output mode may be preset.

At this time, the user may input the output mode distinguished step by step through the inputter 120, and the controller 230 may be configured to adjust the air pressure of the spare tire 110 step by step by determining the air pressure value that corresponds to the received output mode as the target air pressure. For example, when the received output mode is a first output mode, the controller 230 may be configured to determine the target air pressure as a lowest possible value and may be configured to operate the air pressure regulator 220 to adjust the air pressure of the spare tire 110 to reach the lowest possible value. In particular, the first output mode may be a bass enhanced mode, and may be the output mode in which the low range is most abundantly output.

The controller 230 may be configured to reduce the elastic modulus of the spare tire 110 by adjusting the air pressure of the spare tire 110 to reach the lowest possible value. Accordingly, the resonance frequency of the sound source output through the spare tire 110 may be a minimum value. The controller 230 may be configured to transmit an air pressure maximum discharge signal to the air pressure regulator 220 and discharge the air pressure from the spare tire 110 in accordance with the operation of the piston 221 by the actuator 222 of the air pressure regulator 220. The air pressure of the spare tire 110 may be adjusted when the spare tire 110 is not used for driving by the operation of the controller 230. The spare tire 110 may function as a speaker capable of outputting the sound source. Therefore, since an enclosure for a separate speaker unit is not required, space utilization may be increased.

Additionally, since the elastic modulus may be adjusted by adjusting the air pressure of the spare tire 110, the resonance frequency of the sound source output from the spare tire 110 may be adjusted. Therefore, since it may be possible to output sound sources of various ranges, the sound source suitable for the user's request may be output. In other words, the convenience of the user may be increased. The controller 230 may be implemented with the memory storing an algorithm to execute the operation of the components in the vehicle 100 or data regarding a program that implements the algorithm, and the processor configured to perform the aforementioned operation using the data stored in the memory. The memory and the processor may be implemented in separate chips. Alternatively, the memory and the processor may be implemented in a single chip.

At least one component may be added or deleted corresponding to the performance of the components of the vehicle 100 illustrated in FIGS. 1 to 3. It will be readily understood by those skilled in the art that the relative positions of the components may be changed corresponding to the performance or structure of the system. Each of the components illustrated in FIGS. 2 to 3 refers to a software component and/or a hardware component such as a Field Programmable Gate Array (FPGA) and an Application Specific Integrated Circuit (ASIC).

Figure 4:
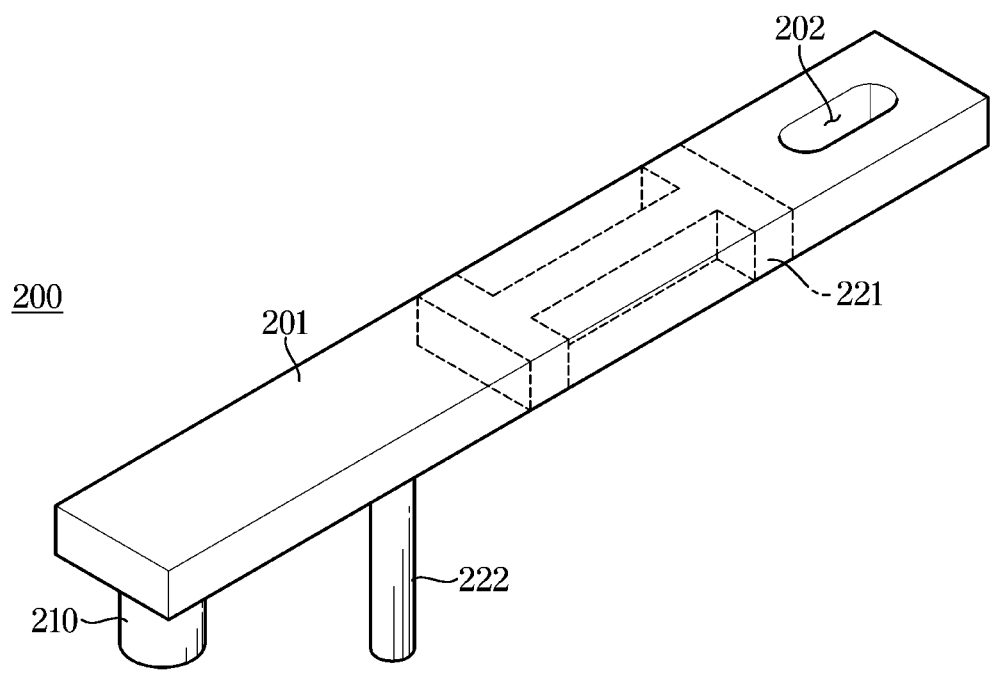
FIG. 4 is a view illustrating an exterior of a speaker unit according to exemplary embodiments of the disclosure.

FIG. 4 is a view illustrating an exterior of a speaker unit according to exemplary embodiments of the disclosure. Referring to FIG. 4, the speaker unit 200 may include an outer case 201 including the piston 221 therein, a tire mounting part 202 adapted to mount the speaker unit 200 on the spare tire 110, an air inlet 222 provided to the spare tire 110, and the vibration generator 210 provided on one surface in contact with the spare tire 110.

The tire mounting part 202 may have a structure for mounting with a part of the spare tire 110, for example, and may have a metal fastening structure such as a screw or a bolt and may be mounted on a center of the spare tire 110. However, the disclosure is not limited thereto and may have various structures for mounting on the spare tire 110. The air inlet 222 may be provided to transmit the air pressure between the spare tire 110 and the speaker unit 220. The air inlet 222 may be implemented as the structure in which the air pressure is transmitted from the speaker unit 220 to the spare tire 110 or from the spare tire 110 to the speaker unit 220.

The vibration generator 210 may have a structure capable of transmitting the vibration to the spare tire 110. The vibration generator 210 may be implemented as the structure that may be connected to the spare tire 110 or may be in contact with the spare tire 110. For example, the vibration generator 210 may be in contact with one surface of the spare tire 110 and the vibration generated in the vibration generator 210 may be transmitted to the spare tire 110 through the contacted surface. However, the connection method of the vibration generator 210 and the spare tire 110 is not limited to the above-described example, and may include various connection methods for transmitting the vibration. Meanwhile, a position and shape of each component of the speaker unit 200 may be variously implemented within a range that may be easily changed by a person skilled in the art.

Figure 5:
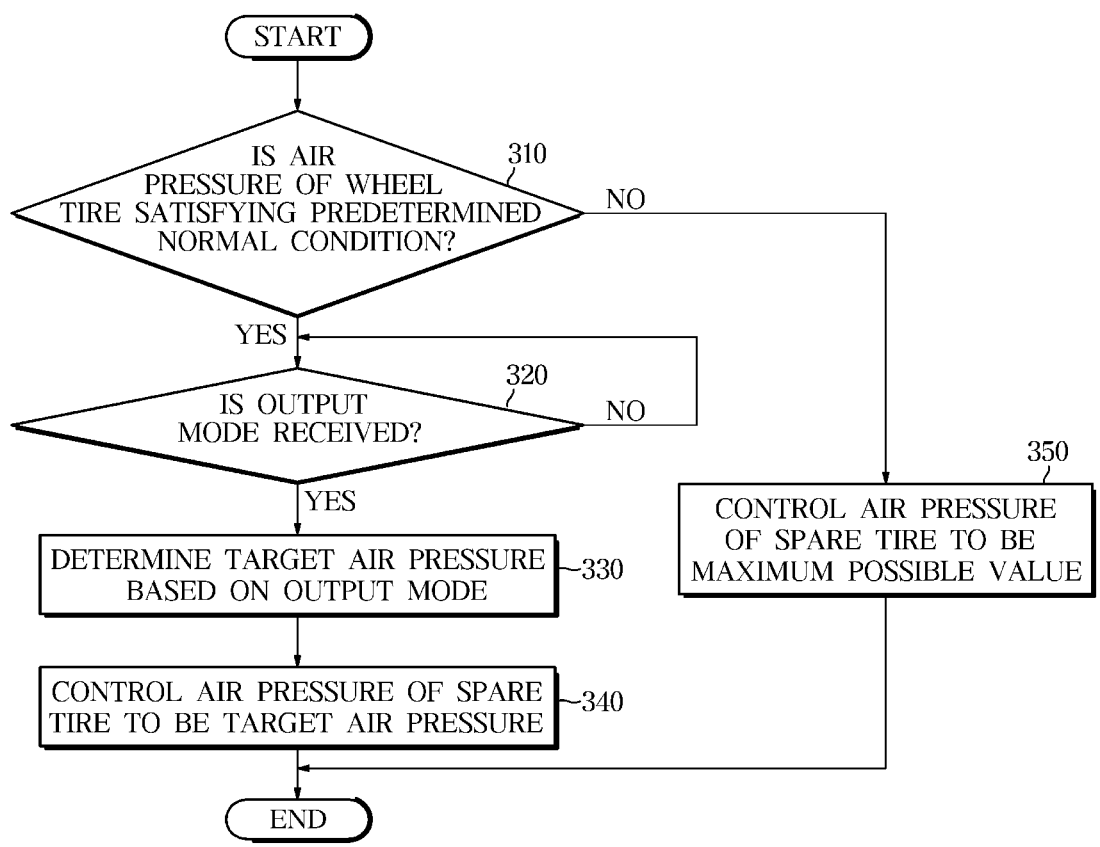
FIG. 5 is a flowchart illustrating a method of controlling a vehicle according to exemplary embodiments of the disclosure.

FIG. 5 is a flowchart illustrating a method of controlling a vehicle according to exemplary embodiments of the disclosure. The method described herein below may be executed by a controller. Referring to FIG. 5, the vehicle 100 may be configured to identify whether the air pressure of the wheel tire satisfies the predetermined normal condition (310). The predetermined normal condition may be the condition for the case where the air pressure of the tire mounted on the wheel is in the state in which the tire may drive. For example, conditions for the normally drivable air pressure range may be included.

When the air pressure of the wheel tire does not satisfy the predetermined normal condition (NO in 310), the vehicle 100 may be configured to adjust the air pressure of the spare tire 110 to be the maximum possible value (350). When the air pressure of the tire mounted on the wheel does not satisfy the predetermined normal condition, the vehicle 100 may be configured to determine that the spare tire 110 is to be used for driving and may be configured to adjust the air pressure of the spare tire 110 to be the maximum possible value to place the spare tire 110 in the driving state before being mounted on the wheel. Accordingly, when the air pressure of the tire mounted on the wheel used for driving is not in a normal state, the vehicle 100 may be configured to operate the spare tire 110 to be in the state suitable for driving, thereby enhancing the driving stability.

As another example, when the air pressure of the wheel tire satisfies the predetermined normal condition (YES in 310), the vehicle 100 may be configured to identify whether the output mode is received (320). In particular, the output mode may refer to the mode for adjusting frequency of the sound source to be output, and may be the mode for emphasizing the sound source having the frequency range of the specific band. For example, the output mode may include the bass setting mode for emphasizing the low range of the user and may include at least one step-by-step bass setting mode for adjusting the amount of bass output.

When the output mode is received (YES in 320), the vehicle 100 may be configured to determine the target air pressure based on the output mode (330). Particularly, the vehicle 100 may be configured to determine the air pressure value that corresponds to the received output mode as the target air pressure. The air pressure value that corresponds to this received output mode may be preset. When the output mode distinguished step by step from the user is received, the vehicle 100 may be configured to determine the stepped air pressure value that corresponds to the received output mode as the target air pressure.

For example, when the received output mode is the first output mode, the vehicle 100 may be configured to determine the target air pressure as the lowest possible value. In particular, the first output mode may be the bass enhanced mode, and may be the output mode in which the low range is most abundantly output. When the target air pressure is determined based on the output mode, the vehicle 100 may be configured to adjust the air pressure of the spare tire 110 to be the target air pressure (340). The vehicle 100 may be configured to transmit the air pressure discharge signal or the air pressure supply signal for reaching the target air pressure to the air pressure regulator 220. The vehicle 100 may be configured to supply or discharge the air pressure from the spare tire 221 by the operation of the piston 221 by the actuator 222 of the air pressure regulator 220. Therefore, the target air pressure may be reached by increasing or decreasing the air pressure of the spare tire 110.

Accordingly, the vehicle 100 may be configured to adjust the elastic modulus of the spare tire 110 through the air pressure adjusting operation of the spare tire 110. The vehicle 100 may be configured to adjust the resonance frequency of the sound source output through the spare tire 110 according to the elasticity modulus of the spare tire 110, unlike the conventional speaker device in which the elastic modulus of a diaphragm is fixed. Therefore, since it may be possible to output the sound sources of various ranges, the sound source suitable for the user's request may be output. In other words, the convenience of the user may be increased. In addition, when the spare tire 110 is not used for driving, the spare tire 110 may function as the speaker capable of outputting the sound source, and thus, the enclosure for the separate speaker unit may be omitted. Therefore, the space utilization may be increased, and the convenience in design and the user convenience may be increased.

As is apparent from the above description, the vehicle and the method of controlling the vehicle according to the exemplary embodiments may replace a subwoofer to which a separate enclosure is applied, thereby minimizing space occupancy in the vehicle. At the same time, since a sound source output of various resonance frequencies is possible, the sound source output may be performed in accordance with various demands of the user, and thus, the convenience of the user may be increased.

Meanwhile, the disclosed exemplary embodiments may be implemented in the form of a recording medium storing instructions that are executable by a computer. The instructions may be stored in the form of a program code, and when executed by a processor, the instructions may generate a program module to perform operations of the disclosed embodiments. The recording medium may be implemented as a non-transitory computer-readable recording medium. The non-transitory computer-readable recording medium may include all types of recording media storing commands that may be interpreted by a computer. For example, the computer-readable recording medium may be ROM, RAM, a magnetic tape, a magnetic disc, flash memory, an optical data storage device, etc.

Exemplary embodiments of the disclosure have thus far been described with reference to the accompanying drawings. It will be obvious to those of ordinary skill in the art that the disclosure may be practiced in other forms than the exemplary embodiments as described above without changing the technical idea or essential features of the disclosure. The above exemplary embodiments are only by way of example, and should not be interpreted in a limited sense.

What is claimed is:

1. A vehicle, comprising:
   a first tire mounted on a wheel of the vehicle;
   a detector configured to detect an air pressure of the first tire;
   a vibration generator including a connection part for connection with one surface of a second tire and configured to generate vibration, the second tire being a spare tire disposed in the vehicle; and
   a controller configured to operate the vibration generator to cause the second tire to vibrate for outputting a sound source when the air pressure of the first tire satisfies a predetermined normal condition and the vibration generator and the second tire are in contact with each other through the connection part.

2. The vehicle according to claim 1, wherein the vibration generator includes:
   a magnet configured to generate a magnetic flux;
   a voice coil configured to vibrate by interaction with the magnetic flux; and
   a power supply configured to apply a current to the voice coil,
   wherein the controller is configured to operate the power supply to apply the current to the voice coil when the air pressure of the first tire satisfies the predetermined normal condition.

3. The vehicle according to claim 2, wherein the second tire is configured to vibrate by the vibration of the voice coil, and generate a sound pressure.

4. The vehicle according to claim 1, further comprising:
   an air pressure regulator configured to adjust an air pressure of the second tire,
   wherein the controller is configured to operate the air pressure regulator to increase or decrease the air pressure of the second tire based on whether the air pressure of the first tire satisfies the predetermined normal condition.

5. The vehicle according to claim 4, wherein the controller is configured to operate the air pressure regulator to adjust the air pressure of the second tire to reach a maximum possible value when the air pressure of the first tire does not satisfy the predetermined normal condition.

6. The vehicle according to claim 4, wherein the controller is configured to operate the air pressure regulator to decrease the air pressure of the second tire when the air pressure of the first tire satisfies the predetermined normal condition.

7. The vehicle according to claim 6, further comprising:
an inputter configured to receive an output mode from a user,
wherein the controller is configured to determine a target air pressure of the second tire based on the received output mode, and operate the air pressure regulator to adjust the air pressure of the second tire to reach the target air pressure.

8. The vehicle according to claim 7, wherein the controller is configured to determine the target air pressure as a lowest possible value when the received output mode is a first output mode.

9. The vehicle according to claim 4, wherein the air pressure regulator includes:
a piston; and
an actuator configured to drive the piston.

10. A method of controlling a vehicle, comprising:
detecting, by a controller, an air pressure of a first tire mounted on a wheel of the vehicle; and
when the air pressure of the first tire satisfies a predetermined normal condition and a vibration generator of the vehicle and a second tire are in contact with each other through a connection part of the vibration generator, operating, by the controller, the vibration generator to generate vibration to cause the second tire to vibrate for outputting a sound source, the second tire being a spare tire disposed in the vehicle.

11. The method according to claim 10, wherein the operating of the vibration generator includes:
applying, by the controller, a current to a voice coil when the air pressure of the first tire satisfies the predetermined normal condition.

12. The method according to claim 11, wherein the applying of the current to the voice coil includes:
vibrating the second tire by vibration of the voice coil; and
generating a sound pressure by the second tire.

13. The method according to claim 10, further comprising:
adjusting, by the controller, an air pressure of the second tire based on whether the air pressure of the first tire satisfies the predetermined normal condition.

14. The method according to claim 13, wherein the adjusting of the air pressure of the second tire includes:
adjusting, by the controller, the air pressure of the second tire to reach a maximum possible value when the air pressure of the first tire does not satisfy the predetermined normal condition.

15. The method according to claim 13, wherein the adjusting of the air pressure of the second tire includes:
decreasing, by the controller, the air pressure of the second tire when the air pressure of the first tire satisfies the predetermined normal condition.

16. The method according to claim 15, further comprising:
receiving, by the controller, an output mode from a user,
wherein the adjusting of the air pressure of the second tire includes:
determining, by the controller, a target air pressure of the second tire based on the received output mode; and
adjusting, by the controller, the air pressure of the second tire to reach the target air pressure.

17. The method according to claim 16, wherein the determining of the target air pressure of the second tire based on the received output mode includes:
determining, by the controller, the target air pressure as a lowest possible value when the received output mode is a first output mode.

18. A non-transitory computer readable medium having stored therein a computer program to execute a method, the method comprising:
in combination with a computing device, detecting an air pressure of a first tire mounted on a wheel of a vehicle; and
when the air pressure of the first tire satisfies a predetermined normal condition and a vibration generator of the vehicle and a second tire are in contact with each other through a connection part of the vibration generator, operating the vibration generator to generate vibration to cause the second tire to vibrate for outputting a sound source, the second tire being a spare tire disposed in the vehicle.

* * * * *